United States Patent
Hirose et al.

(10) Patent No.: US 8,173,897 B2
(45) Date of Patent: May 8, 2012

(54) SUPERCONDUCTING CABLE LINE

(75) Inventors: Masayuki Hirose, Osaka (JP); Yuichi Yamada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1370 days.

(21) Appl. No.: 11/597,990

(22) PCT Filed: Jul. 12, 2005

(86) PCT No.: PCT/JP2005/012821
§ 371 (c)(1),
(2), (4) Date: Nov. 30, 2006

(87) PCT Pub. No.: WO2006/011357
PCT Pub. Date: Feb. 2, 2006

(65) Prior Publication Data
US 2007/0179062 A1    Aug. 2, 2007

(30) Foreign Application Priority Data

Jul. 29, 2004  (JP) ................................ 2004-222525
Mar. 14, 2005  (JP) ................................ 2005-072053

(51) Int. Cl.
*H01B 12/00* (2006.01)
(52) U.S. Cl. .................... 174/15.5; 174/15.4; 174/125.1; 62/50.7; 62/259.2; 62/79; 62/113; 505/230; 505/231; 505/886; 505/888; 29/299
(58) Field of Classification Search .................... 62/50.7, 62/259.2, 79, 113; 174/15.4, 15.5, 125, 125.1; 505/230, 231, 886, 888; 29/599, 992
See application file for complete search history.

(56) References Cited

U.S. PATENT DOCUMENTS

| | | | | |
|---|---|---|---|---|
| 3,657,467 A | * | 4/1972 | Matthaus et al. | 174/15.5 |
| 3,800,062 A | * | 3/1974 | Kataoka et al. | 174/15.5 |
| 4,132,858 A | * | 1/1979 | Anderson et al. | 174/120 SR |
| 4,473,765 A | * | 9/1984 | Butman et al. | 310/215 |

FOREIGN PATENT DOCUMENTS

| | | | |
|---|---|---|---|
| JP | 02103814 A | * | 4/1990 |
| JP | 02109211 A | * | 4/1990 |
| JP | 10-092627 | | 4/1998 |
| JP | 2002-130851 | | 5/2002 |
| JP | 2002-352645 A | | 12/2002 |

(Continued)

OTHER PUBLICATIONS

English translation of Decision to Grant dated Nov. 24, 2008 for related Russian patent application No. 2006143759/09(047789).

(Continued)

*Primary Examiner* — Frantz Jules
*Assistant Examiner* — Azim Rahim
(74) *Attorney, Agent, or Firm* — Foley & Lardner LLP (57) ABSTRACT

A superconducting cable line includes a heat insulation pipe for a fluid for transporting liquid hydrogen, a superconducting cable housed in the heat insulation pipe for a fluid, and heat exchange means for performing a heat exchange between liquid hydrogen and a refrigerant of the cable. The superconducting cable includes a cable core inside a heat insulation pipe for a cable and is housed in the heat insulation pipe for a fluid to form a low temperature environment around the cable and a double heat insulation structure including the heat insulation pipe. Therefore, since heat intrusion into the superconducting cable is reduced and the refrigerant is cooled with liquid hydrogen, the line can reduce energy for cooling the refrigerant.

12 Claims, 4 Drawing Sheets

FOREIGN PATENT DOCUMENTS

| | | |
|---|---|---|
| JP | 2005-90636 A | 4/2005 |
| JP | 2005-122991 A | 5/2005 |
| RU | 2 087 956 C1 | 8/1997 |
| RU | 97102623 A | 2/1999 |
| TW | 306076 | 5/1997 |
| TW | 518614 | 1/2003 |
| TW | 589644 | 6/2004 |

OTHER PUBLICATIONS

Japanese Patent Office, International search report related to PCT/JP2005/012821.

Taiwan Office Action dated Aug. 26, 2011 in Application No. 094125558.

* cited by examiner

SUPERCONDUCTING CABLE LINE

TECHNICAL FIELD

The present invention relates to a line for power supply including a superconducting cable. More specifically, the present invention relates to a superconducting cable line which decreases heat intrusion into a superconducting cable to reduce energy for cooling a refrigerant used in the cable and can increase a coefficient of performance (COP) as a whole line.

BACKGROUND ART

Figure 7:
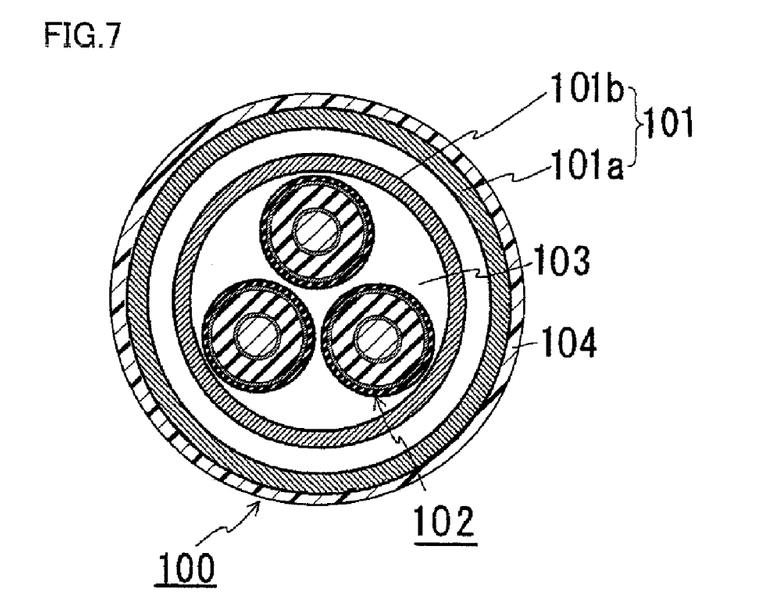
FIG. 7 is a cross-sectional view of a three-core type superconducting cable for three-phase AC transmission.
Figure 8:
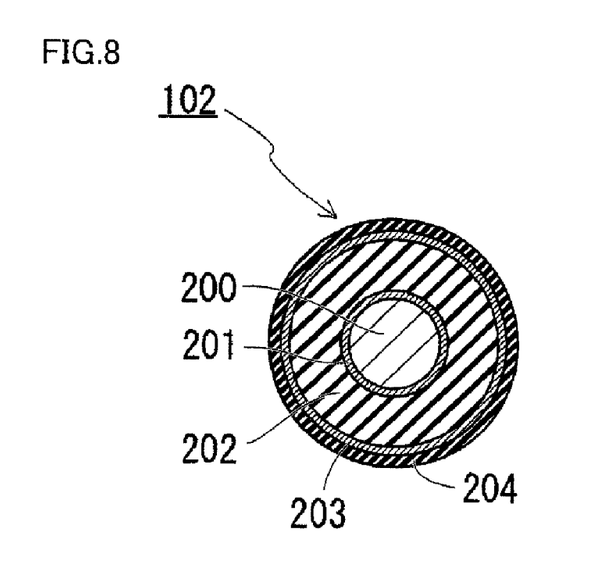
FIG. 8 is a cross-sectional view of each cable core.

A superconducting cable including a heat insulation pipe housing a cable core having a superconducting conductor layer has been conventionally known. Such a superconducting cable includes, for example, a single-core cable having a heat insulation pipe housing one cable core or a three-core cable housing three cable cores in a bundle. FIG. 7 is a cross-sectional view of a three-core superconducting cable for three-phase AC transmission. FIG. 8 is a cross-sectional view of each cable core 102. This superconducting cable 100 has a construction in which three stranded cable cores 102 are housed in a heat insulation pipe 101. Heat insulation pipe 101 has a construction in which a heat insulating material (not shown) is arranged between a double pipe formed with an external pipe 101a and an internal pipe 101b, and air between the pipes 101a, 101b is evacuated. Each cable core 102 includes, from a center portion thereof, a former 200, a superconducting conductor layer 201, an electrical insulation layer 202, a superconducting shield layer 203, and a protection layer 204. Space 103 enclosed with internal pipe 101b and each cable core 102 becomes a passage of a refrigerant such as liquid nitrogen. A superconducting state of superconducting conductor layer 201 and superconducting shield layer 203 of cable core 102 is maintained by cooling with the refrigerant. A corrosion-proof layer 104 is included on an outer periphery of heat insulation pipe 101.

The superconducting cable must be continuously cooled with the refrigerant such as liquid nitrogen to maintain the superconducting state of the superconducting conductor layer and the superconducting shield layer. Therefore, a line using the superconducting cable usually includes a cooling system for a refrigerant. With this system, circulation cooling is performed in which the refrigerant ejected from the cable is cooled and the cooled refrigerant again flows into the cable.

With cooling of the refrigerant to an appropriate temperature by the cooling system, the superconducting cable can maintain the superconducting state of the superconducting conductor layer and the superconducting shield layer by sufficiently decreasing an increase in a temperature of the refrigerant due to heat generated by passage of a current or heat intrusion into the cable from the outside such as an atmosphere. When the refrigerant is liquid nitrogen, however, energy required for cooling the refrigerant to address such generated heat or heat intrusion becomes at least 10 times higher than energy handled by the refrigerant to cool the cable. Therefore, when the superconducting cable line including the cooling system for the refrigerant is considered as a whole, a coefficient of performance (COP) becomes about 0.1 or lower. Such a low COP is one of causes of a decreased application effect of a superconducting apparatus such as a superconducting cable. Thus, each of Japanese Patent Laying-Open No. 2002-130851 (Patent Document 1) and Japanese Patent Laying-Open No. 10-092627 (Patent Document 2) proposes to cool a refrigerant of a superconducting coil utilizing cold heat of a liquefied natural gas (an LNG).

On the other hand, with proceeding development of a fuel cell vehicle, there are plans to build hydrogen stations at many places in Japan for storing compressed hydrogen or liquid hydrogen to be fed to the fuel cell vehicle. The hydrogen station includes, for example, a tank for storing liquid hydrogen produced in a factory and transported or liquid hydrogen produced in the station, and a cooling system for liquefying vaporized hydrogen to maintain a liquid state. Though hydrogen can be maintained in the liquid state by cooling to an appropriate temperature with this cooling system, heat intrusion into the cable from the outside becomes large since liquid hydrogen has a cryogenic boiling point of about 20 K which is substantially different from an ordinary temperature of an atmosphere. Therefore, an enormous amount of energy is required for cooling liquid hydrogen to reduce an increase in a temperature due to heat intrusion.

Patent Document 1: Japanese Patent Laying-Open No. 2002-130851

Patent Document 2: Japanese Patent Laying-Open No. 10-092627

DISCLOSURE OF THE INVENTION

Problems to be Solved by the Invention

Each of Patent Documents 1 and 2 described above merely discloses utilization of cold heat of an LNG for cooling a refrigerant of a superconducting coil, and does not consider as to reduction of heat intrusion from the outside. On the other hand, in a liquid hydrogen station, it is also desired to decrease energy for cooling hydrogen, as described above.

Therefore, a main object of the present invention is to provide a superconducting cable line which can reduce heat intrusion into the superconducting cable and can totally reduce energy for cooling the superconducting cable and energy for cooling liquid hydrogen.

Means for Solving the Problems

The present invention attains the above-described object by arranging a superconducting cable in a heat insulation pipe transporting liquid hydrogen and exchanging heat between liquid hydrogen and a refrigerant of the cable. That is, a superconducting cable line of the present invention includes a heat insulation pipe for a fluid for transporting liquid hydrogen and a superconducting cable housed in the heat insulation pipe for a fluid for cooling a superconducting portion with a refrigerant having a temperature higher than that of liquid hydrogen. Heat exchange means for cooling liquid hydrogen and rising a temperature of the refrigerant of the superconducting cable cooled with liquid hydrogen is further included. The present invention will be described in a more detail in the following.

The superconducting cable utilized in the present invention has a construction including a superconducting portion formed with a superconducting material and a heat insulation pipe (hereafter referred to as a heat insulation pipe for a cable) housing the superconducting portion and filled with a refrigerant for cooling the superconducting portion. The superconducting portion may include a superconducting conductor layer for passing a current for power supply and an external superconducting layer for passing a current having substantially the same value as that for the superconducting conductor layer in an opposite direction. The superconducting portion is generally formed in a cable core. Therefore, the superconducting cable may be constructed by housing the cable core including the superconducting layer in the heat insulation pipe for a cable. A more specific construction of the cable core may include, from a center portion thereof, a former, a superconducting conductor layer, an electrical insulation layer, an external superconducting layer, and a protection layer. The heat insulation pipe for a cable may house one cable core (a single core (one core)) or a plurality of cable cores (a plurality of cores). More specifically, when the line of the present invention is used for three-phase AC transmission, for example, a three-core cable having the heat insulation pipe for a cable housing three stranded cores may be utilized, and when the line of the present invention is used for single-phase AC transmission, a single-core cable having the heat insulation pipe for a cable housing one core may be utilized. When the line of the present invention is used for DC transmission (monopolar transmission), for example, a single-core cable having the heat insulation pipe for a cable housing one core may be utilized, and when the line of the present invention is used for DC transmission (bipolar transmission), a two-core cable or a three-core cable having the heat insulation pipe for a cable housing two or three stranded cores may be utilized. As described above, the superconducting cable line of the present invention can be utilized for either of the DC transmission and the AC transmission.

The superconducting conductor layer may be formed by, for example, spirally winding a tape-like wire including a plurality of filaments made of a Bi-based oxide superconducting material, more specifically, a Bi2223-based superconducting material which are arranged in a matrix such as a silver sheath. The superconducting conductor layer may have a single-layer or multilayer structure. When the superconducting conductor layer has a multilayer structure, an interlayer insulation layer may be provided therein. The interlayer insulation layer may be provided by winding insulating paper such as kraft paper or semisynthetic insulating paper such as PPLP (a trademark of Sumitomo Electric Industries, Ltd.). The superconducting conductor layer is formed by winding a wire made of the superconducting material around the former. The former may be a solid or hollow body formed with a metal material such as copper or aluminum, and may have a construction of, for example, a plurality of stranded copper wires. A copper wire having insulating coating may be utilized. The former functions as a shape-maintaining member of the superconducting conductor layer. A cushion layer may be interposed between the former and the superconducting conductor layer. The cushion layer avoids direct contact of metals between the former and a superconducting wire to prevent the superconducting wire from being damaged. In particular, when the former has a stranded structure, the cushion layer also has a function to smooth a surface of the former. Insulating paper or carbon paper can be suitably utilized as a specific material of the cushion layer.

The electrical insulation layer may be formed by winding semisynthetic insulating paper such as PPLP (trademark) or insulating paper such as kraft paper on the superconducting conductor layer. A semi-conducting layer may be formed with carbon paper or the like on at least one of an inner periphery and an outer periphery of the electrical insulation layer, that is, between the superconducting conductor layer and the electrical insulation layer and between the electrical insulation layer and the external superconducting layer (described below). With formation of an internal semi-conducting layer, the former, or an external semi-conducting layer, the latter, adhesion between the superconducting conductor layer and the electrical insulation layer or between the electrical insulation layer and the external superconducting layer is increased to suppress deterioration due to an occurrence of partial discharge or the like.

When the line of the present invention is used for DC transmission, the electrical insulation layer may be subjected to $\rho$ grading for attaining a low resistivity on an inner periphery side of the electrical insulation layer and a high resistivity on an outer periphery side to smooth a DC electric field distribution in a diameter direction (a thickness direction) thereof. As described above, "$\rho$ grading" means varying of a resistivity in the thickness direction of the electrical insulation layer in a stepwise manner, which can smooth the DC electric field distribution in a whole thickness direction of the electrical insulation layer and can decrease a thickness of the electrical insulation layer. Though a number of layers having varied resistivities is not specifically limited, two or three layers are practical. In particular, smoothing of the DC electric field distribution can be performed more effectively when a thickness of each layer is equalized.

The $\rho$ grading may be performed using insulating materials having resistivities ($\rho$) different from each other. When insulating paper such as kraft paper is utilized, for example, a resistivity can be varied by varying a density of the kraft paper or adding dicyandiamide to the kraft paper. When composite paper formed with insulating paper and a plastic film such as PPLP (trademark) is utilized, a resistivity can be varied by varying a ratio $k=(t_p/T) \times 100$, a ratio of a thickness $t_p$ of the plastic film to a thickness T of whole composite paper, or by varying a density, a material, an additive or the like of the insulating paper. A value of ratio k is preferably within a range of, for example, about 40-90%. Generally, resistivity $\rho$ becomes higher as ratio k increases.

Furthermore, when the electrical insulation layer has a high $\epsilon$ layer provided near the superconducting conductor layer and having a permittivity higher than that in another portion, an Imp. withstand voltage property can be increased in addition to an increase in a DC withstand voltage property. A permittivity $\epsilon$ (20° C.) is about 3.2-4.5 in general kraft paper, about 2.8 in composite paper having ratio k of 40%, about 2.6 in composite paper having the ratio of 60%, and about 2.4 in composite paper having the ratio 80%. The electrical insulation layer constructed with composite paper using kraft paper having high ratio k and higher airtightness is especially preferable because both of a DC withstand voltage and an Imp. withstand voltage are increased.

A cable also suitable for AC transmission is formed by constructing the electrical insulation layer to have permittivity $\epsilon$ increased toward the inner periphery side and decreased toward the outer periphery side, in addition to the $\rho$ grading described above. This "$\epsilon$ grading" is also performed over a whole region in the diameter direction of the electrical insulation layer. In addition, the superconducting cable subjected to the $\rho$ grading described above has good DC characteristics and can be suitably utilized as a DC transmission line. On the other hand, most of current transmission lines are constructed for AC transmission. When a transmission system is shifted from an AC system to a DC system, a situation may occur in which an AC is transiently transmitted using the superconducting cable subjected to the $\rho$ grading before shifting to the DC transmission. This situation may occur when, for example, a cable of a portion of a transmission line was replaced with the superconducting cable subjected to the $\rho$ grading but the other portions are still a cable for the AC transmission, or when the cable for the AC transmission of the transmission line was replaced with the superconducting cable subjected to the $\rho$ grading but a transmission apparatus connected to the cable is still an apparatus for the AC. In this situation, the AC transmission is transiently performed with the superconducting cable subjected to the ρ grading, and then the system is finally shifted to the DC transmission. Therefore, the superconducting cable is preferably designed not only to have the good DC characteristics but also with AC characteristics taken into consideration. When the AC characteristics are also taken into consideration, the superconducting cable having a good impulse characteristic such as a surge can be constructed by constructing the electrical insulation layer to have permittivity ϵ increased toward the inner periphery side and decreased toward the outer periphery side. Then, when a transient period as described above is ended and the DC transmission is performed, the superconducting cable subjected to the ρ grading used in the transient period can be continuously utilized as a DC cable. That is, the line using the superconducting cable subjected to the ϵ grading in addition to the ρ grading can be suitably utilized for each of the DC transmission and the AC transmission, and can also be suitably utilized as a line for both of AC and DC transmission.

PPLP (trademark) described above generally has a higher ρ value and a lower ϵ value as ratio k is increased. Therefore, ρ can be increased toward the outer periphery side and, concurrently, ϵ can be decreased toward the outer periphery side when the electrical insulation layer is constructed using PPLP (trademark) having ratio k increased toward the outer periphery side of the electrical insulation layer.

On the other hand, kraft paper generally has a higher ρ value and a higher ϵ value as airtightness is increased. Therefore, it is difficult to construct the electrical insulation layer having ρ increased toward the outer periphery side and ϵ decreased toward the outer periphery side only with kraft paper. Therefore, the electrical insulation layer is suitably constructed using kraft paper in combination with composite paper. As an example, a kraft paper layer may be formed on the inner periphery side of the electrical insulation layer and a PPLP layer may be formed on the outside thereof to make resistivity ρ lower in the kraft paper layer than in the PPLP layer and permittivity ϵ higher in the kraft paper layer than in the PPLP layer.

The external superconducting layer is provided on the outer periphery of the electrical insulation layer described above. The external superconducting layer is formed with a superconducting material, as for the superconducting conductor layer. The superconducting material similar to that utilized to form the superconducting conductor layer may be used in the external superconducting layer. When the superconducting cable line of the present invention is utilized for the DC transmission, the external superconducting layer may be utilized as, for example, a return conductor in monopolar transmission or a neutral conductor layer in bipolar transmission. In particular, when the bipolar transmission is performed, the external superconducting layer may be utilized to pass an unbalanced current when an unbalance occurs between a positive electrode and a negative electrode. In addition, when one electrode is in an abnormal state and the bipolar transmission is changed to the monopolar transmission, the external superconducting layer may be utilized as a return conductor for passing a current equivalent to a transmitted current flowing through the superconducting conductor layer. When the superconducting cable line of the present invention is utilized for the AC transmission, the external superconducting layer may be utilized as a shield layer passing a current induced by a current flowing through the superconducting conductor layer. A protection layer also for insulation may be provided on an outer periphery of the external superconducting layer.

The heat insulation pipe for a cable for housing the cable core having a construction as described above may have a double pipe structure formed with an external pipe and an internal pipe, which includes a heat insulating material between the pipes and evacuation is performed to attain a prescribed degree of vacuum to form a vacuum insulation construction. Space inside the internal pipe is utilized as a refrigerant passage which is filled with a refrigerant such as liquid nitrogen for cooling the cable core (especially, the superconducting conductor layer and the external superconducting layer). The heat insulation pipe for a cable as such is preferably a flexible corrugated pipe. In particular, the heat insulation pipe for a cable is preferably formed by a metal material such as stainless having high strength.

The refrigerant filling the heat insulation pipe for a cable which is utilized in the present invention has a temperature higher than that of liquid hydrogen transported inside the heat insulation pipe for a fluid. Liquid nitrogen, for example, is utilized as the refrigerant. Since liquid hydrogen has a temperature lower than that of the refrigerant of the superconducting cable, the refrigerant of the superconducting cable housed in the heat insulation pipe for a fluid is cooled with liquid hydrogen. Therefore, in the line of the present invention, a temperature capable of maintaining a superconducting state of the superconducting portion can be set without providing a separate cooling system for the refrigerant for cooling the refrigerant of the superconducting cable.

In the line of the present invention, the superconducting cable having the heat insulation pipe for a cable is housed in the heat insulation pipe for a fluid used for transportation of liquid hydrogen. With this construction, the superconducting cable housed in the heat insulation pipe for a fluid has an environment around the cable having a temperature lower than an ordinary temperature, more specifically, a cryogenic environment of about 20 K which is the temperature of liquid hydrogen, and thus a temperature difference between the inside and the outside of the heat insulation pipe for a cable is decreased to less than 200 K as compared to a situation of laying in an atmosphere. In particular, when liquid nitrogen is used as the refrigerant of the cable, the temperature difference between the inside and the outside of the heat insulation pipe for a cable becomes about 50 K. In addition, the superconducting cable housed in the heat insulation pipe for a fluid has a double heat insulation structure formed with a heat insulation structure for liquid hydrogen and a heat insulation structure of the cable itself. Therefore, since the line of the present invention has a small temperature difference between the inside and the outside of the heat insulation pipe for a cable and the superconducting cable having the double heat insulation structure as described above, heat intrusion from the outside into a cable portion can be effectively reduced as compared to a superconducting cable line laid in the atmosphere.

A heat insulation pipe having heat insulation performance corresponding to liquid hydrogen transported therein may be utilized as the heat insulation pipe for a fluid housing the superconducting cable. As an example, a heat insulation pipe having a construction similar to that for the superconducting cable may be utilized, that is, a construction having a double pipe structure formed with an external pipe and an internal pipe, which includes a heat insulating material between the pipes and is subjected to evacuation. In this situation, space inside the internal pipe becomes a transportation passage for liquid hydrogen.

When the heat insulation pipe for a fluid is formed by welding a metal plate made of stainless, steel or the like, for example, the superconducting cable may be housed in the heat insulation pipe for a fluid by arranging the cable on the plate, bending the plate to cover the cable, and welding edges of the plate. When a metal tube made of stainless, steel or the like is used as the heat insulation pipe for a fluid, the cable can be housed in the heat insulation pipe for a fluid by inserting the superconducting cable into the tube. In this situation, a skid wire (a slide wire) may be spirally wound around the cable to improve an insertion property of the superconducting cable. In particular, when the heat insulation pipe for a cable is a corrugated pipe having projections and depressions, the insertion property is improved by winding the skid wire with a pitch larger than that of the projections and depressions of the corrugated pipe (a long pitch) to prevent the skid wire from entering a depressed portion of the corrugated pipe to locate the skid wire over the projections and depressions to prevent an outer periphery of the corrugated pipe from directly contacting the heat insulation pipe for a fluid, that is, to achieve point contact between the skid wire wound around the corrugated pipe and the heat insulation pipe for a fluid. Furthermore, a tension member or the like may be attached to the superconducting cable to draw into the heat insulation pipe for a fluid.

The superconducting cable housed in the heat insulation pipe for a fluid may be arranged to contact liquid hydrogen transported inside the heat insulation pipe for a fluid or not to contact liquid hydrogen. In the former situation, the superconducting cable may be immersed in liquid hydrogen. In this situation, since a whole periphery of the superconducting cable contacts cryogenic liquid hydrogen, heat intrusion from the outside into the cable can be effectively reduced and the refrigerant of the cable can be sufficiently cooled with liquid hydrogen.

When the superconducting cable is immersed in liquid hydrogen, on the other hand, a problem such as an explosion of liquid hydrogen may arise in case the superconducting cable is short-circuited, for example, to generate a spark. Therefore, a region inside the heat insulation pipe for a fluid may be divided into a transportation region for liquid hydrogen and a region for arranging the superconducting cable therein. As the transportation region, for example, a transportation pipe for liquid hydrogen may be separately arranged inside the heat insulation pipe for a fluid, and the superconducting cable may be arranged longitudinally along the transportation pipe. In this situation, when a heat exchanger spacer having high heat conductivity is arranged in space inside the heat insulation pipe for a fluid not occupied by the transportation pipe and the superconducting cable, heat from liquid hydrogen can be efficiently conducted to the cable via the heat exchanger spacer, and therefore the cable can be cooled effectively. The heat exchanger spacer as such may be formed with, for example, a material having high heat conductivity such as aluminum. More specifically, the heat exchanger spacer may be formed by winding aluminum foil.

In the present invention, the superconducting cable utilizing the refrigerant having a temperature higher than that of liquid hydrogen is used and, since the cable is housed in the heat insulation pipe for a fluid which transports liquid hydrogen, the refrigerant can be cooled with liquid hydrogen. The refrigerant of the superconducting cable, however, may be excessively cooled with liquid hydrogen and solidification of the refrigerant may occur. Therefore, it is desirable to rise a temperature of the excessively cooled refrigerant of the superconducting cable housed in the heat insulation pipe for a fluid within a temperature range capable of maintaining the superconducting state. On the other hand, liquid hydrogen is desirably cooled to maintain a liquid state (to liquefy). Therefore, the present invention includes heat exchange means for exchanging heat between liquid hydrogen and liquid nitrogen in order to cool liquid hydrogen and rise a temperature of the refrigerant excessively cooled with liquid hydrogen.

The heat exchange means may have a construction including, for example, a passage circulating a heat-exchanging medium, an expansion valve expanding the heat-exchanging medium, a compressor compressing the expanded heat-exchanging medium, and a heat insulation case housing the passage, the expansion valve and the compressor. A transportation pipeline for liquid hydrogen is arranged on a portion of the passage which passed through the expansion valve so as to cool liquid hydrogen with the expanded heat-exchanging medium, while a transportation pipeline for the refrigerant of the cable is arranged on a portion of the passage which passed through the compressor so as to rise a temperature of the refrigerant of the superconducting cable with the compressed heat-exchanging medium. The transportation pipeline for liquid hydrogen may be provided to form, for example, a circulation path in which liquid hydrogen ejected from the heat insulation pipe for a fluid again flows into the heat insulation pipe for a fluid. Alternatively, a tank storing liquid hydrogen may be connected to the heat insulation pipe for a fluid, and the transportation pipeline may be provided to form a circulation path in which liquid hydrogen ejected from the tank again flows into the tank. Then, a portion of the transportation pipeline for liquid hydrogen as such is arranged to contact the portion of the passage of the heat-exchanging medium which passed through the expansion valve, or arranged adjacent to the portion. The transportation pipeline for the refrigerant may be provided to form a circulation path in which the refrigerant ejected from the heat insulation pipe for a cable again flows into the heat insulation pipe for a cable. Then, a portion of the transportation pipeline for the refrigerant as such is arranged to contact the portion of the passage of the heat-exchanging medium which passed through the compressor, or arranged adjacent to the portion. In the heat exchange means, the temperature of the refrigerant is risen within a temperature range capable of maintaining the superconducting state of the superconducting portion. Since the heat exchange means for cooling liquid hydrogen and concurrently heating the refrigerant of the cable is included, the present invention can concurrently meet both of a requirement of temperature rising of the refrigerant of the superconducting cable and a requirement of cooling of liquid hydrogen.

It is to be noted that, in the present invention, since heat intrusion into the superconducting cable housed in the heat insulation pipe for a fluid is reduced as described above, a heat insulation structure of the heat insulation pipe for a cable can be simplified, that is, a level of heat insulation performance for the heat intrusion from the outside into the cable can be made lower. When the heat insulation pipe for a cable has a construction of a double pipe structure formed with an external pipe and an internal pipe, in which a heat insulating material is arranged between the pipes and evacuation is performed, the heat insulation performance can be varied by, for example, varying a degree of vacuum between the external pipe and the internal pipe, varying a number of winding of the heat insulating material arranged between the external pipe and the internal pipe, or varying a material of the heat insulating material.

In addition, in the superconducting cable line of the present invention, a whole length in a longitudinal direction of the superconducting cable forming the line may be housed in the heat insulation pipe for a fluid, or only a portion of the cable may be housed in the heat insulation pipe for a fluid. Considering reduction of heat intrusion, it is preferable to house a whole length of the superconducting cable in the heat insulation pipe for a fluid.

The superconducting cable line of the present invention as such may be constructed by, for example, housing the superconducting cable in a pipeline having a heat insulation structure for connecting a hydrogen plant producing liquid hydrogen with a hydrogen station storing liquid hydrogen, or in a heat insulation pipe transporting liquid hydrogen in the hydrogen station, and providing the heat exchange means near the hydrogen station. The line of the present invention may be utilized to supply power to various power apparatuses used in the hydrogen station, or to draw power from the pipeline as required to supply power to each place.

As described above, the superconducting cable line of the present invention can be utilized for either of the DC transmission and the AC transmission. When three-phase AC transmission is performed, for example, the cable may be formed as a three-core superconducting cable, in which the superconducting conductor layer of each core is utilized for transmission of each phase and the external superconducting layer of each core is utilized as a shield layer. When single-phase AC transmission is performed, the cable may be formed as a single-core superconducting cable, in which the superconducting conductor layer included in the core is utilized for transmission of the phase and the external superconducting layer is utilized as a shield layer. When monopolar DC transmission is performed, the cable may be formed as a single-core superconducting cable, in which the superconducting conductor layer of the core is utilized as a go conductor and the external superconducting layer is utilized as a return conductor. When bipolar DC transmission is performed, the cable may be formed as a two-core superconducting cable, in which the superconducting conductor layer of one core is utilized for positive electrode transmission, the superconducting conductor layer of the other core is utilized for negative electrode transmission, and the external superconducting layer of each core is utilized as a neutral conductor layer.

In addition, the superconducting cable line of the present invention can also be utilized as a line for both of the DC and AC transmission by utilizing the superconducting cable including the cable core having the electrical insulation layer subjected to $\rho$ grading and $\epsilon$ grading as described above. In this situation, not only the superconducting cable but also a terminal structure formed in an end portion of the line for connecting the superconducting cable with a conductive portion on a side of an ordinary temperature (a normal-conducting cable, a lead connected to the normal-conducting cable or the like) is preferably constructed to be suitable for both of the DC and AC transmission. A representative construction of the terminal structure includes an end portion of the cable core extending from an end portion of the superconducting cable, an extraction conductor portion connected to the conductive portion on an ordinary temperature side, a connection portion electrically connecting the end portion of the core with the extraction conductor portion, and an end connection box housing the end portion of the core, an end portion of the extraction conductor portion on a side connected to the core, and the connection portion. The end connection box generally includes a refrigerant bath cooling the end portion of the core or the end portion of the extraction conductor portion, and a vacuum insulation bath arranged on an outer periphery of the refrigerant bath. In the terminal structure as such, a cross-sectional area of a conductor of the extraction conductor portion is desirably variable because an amount of a current flowing through the extraction conductor portion may be different in the AC transmission and the DC transmission.

Therefore, a suitable construction of the terminal structure for both of the AC and DC transmission has a cross-sectional area of the conductor of the extraction conductor portion variable according to a load. The terminal structure as such may have a construction, for example, in which the extraction conductor portion is divided into a low temperature-side conductor portion connected to the end portion of the core and an ordinary temperature-side conductor portion arranged on a side of the conductive portion on the ordinary temperature side, which low temperature-side conductor portion and ordinary temperature-side conductor portion are removable from each other. Furthermore, a plurality of removable extraction conductor portions as such are included to allow the cross-sectional area of the conductor of a whole extraction conductor portion to vary according to a number of connections between the low temperature-side conductor portions and the ordinary temperature-side conductor portions. A cross-sectional area of the conductor of each extraction conductor portion may be the same or different from each other. The superconducting cable line of the present invention including the terminal structure as such can readily change from the DC transmission to the AC transmission, or from the AC transmission to the DC transmission, by performing attachment or removal of the extraction conductor portion. In addition, since the cross-sectional area of the conductor of the extraction conductor portion can be varied as described above, the cross-sectional area of the conductor can also be varied as appropriate when an amount of supplied power is varied during the AC transmission or the DC transmission.

Effects of the Invention

In a superconducting cable line according to the present invention having a construction as described above, a superconducting cable is housed in a heat insulation pipe transporting liquid hydrogen to decrease a temperature difference between the inside and outside of a heat insulation pipe for a cable, and a heat insulation structure of the cable is formed as a double heat insulation structure including the heat insulation pipe for a cable and a heat insulation pipe for a fluid to effectively reduce heat intrusion into the cable. In addition, in the line of the present invention, a refrigerant of the superconducting cable can be cooled with liquid hydrogen transported in the heat insulation pipe for a fluid. With reduction of heat intrusion and cooling of the refrigerant utilizing a fluid as described above, the line of the present invention can substantially decrease or substantially eliminate energy for cooling the refrigerant of the cable. In particular, a cooling system for the refrigerant of the superconducting cable is not required, or even if the cooling system is provided, a level of cooling performance thereof can be made lower as compared to a conventional system.

Therefore, when cooling of the refrigerant of the superconducting cable is also taken into consideration, the superconducting cable line of the present invention having the construction as described above can increase a coefficient of performance as compared to a conventional line because energy for cooling the refrigerant can be substantially reduced by reducing the heat intrusion into the cable, as described above. In particular, reduction of the heat intrusion is extremely effective for increasing the coefficient of performance when the line of the present invention is used as a line for DC transmission in which heat (a conductor loss) is hardly generated with passage of a current, since the heat intrusion becomes a main cause of an energy loss in this situation.

In addition, in the line of the present invention, energy for cooling liquid hydrogen is also significantly decreased by utilizing the refrigerant of the superconducting cable as an object of a heat exchange for cooling liquid hydrogen. Therefore, the present invention can totally reduce energy for cooling the refrigerant of the superconducting cable and energy for cooling liquid hydrogen to substantially increase the coefficient of performance.

Furthermore, when a superconducting cable including a cable core having an electrical insulation layer subjected to ρ grading is utilized in the line of the present invention, the line can have a good DC withstand voltage property and can be suitable for DC transmission. In addition, when a superconducting cable including a cable core having an electrical insulation layer subjected to ρ grading and provided to have a higher ε value in a portion near a superconducting conductor layer is utilized in the line of the present invention, an Imp. withstand voltage property can also be increased in addition to an increase in the DC withstand voltage property as described above. In particular, the line of the present invention can also have good AC electric characteristics when the electrical insulation layer is formed to have an ε value increased toward an inner periphery side and decreased toward an outer periphery side. Therefore, the superconducting cable line of the present invention can be suitably utilized for each of DC transmission and AC transmission. In addition, when the superconducting cable including the cable core having the electrical insulation layer subjected to ρ grading and ε grading is utilized as the line of the present invention and a terminal structure formed in an end portion of the line has a construction having a variable cross-sectional area of a conductor of an extraction conductor portion arranged between the superconducting cable and a conductive portion on an ordinary temperature side, the line of the present invention can be suitably utilized in a transient period in which a transmission system is changed from an AC system to a DC system.

DESCRIPTION OF THE REFERENCE SIGNS

1: liquid hydrogen, 2: heat insulation pipe for a fluid, 2a: external pipe, 2b: internal pipe, 3: transportation pipe, 4: heat exchanger spacer, 10: superconducting cable, 11: heat insulation pipe for a cable, 11a: external pipe, 11b: internal pipe, 12: cable core, 13: space, 14: superconducting conductor layer, 15: external superconducting layer, 16: transportation pipeline, 20: hydrogen station, 21: tank, 22: transportation pipeline, 30: heat exchange means, 31: passage, 32: expansion valve, 33: compressor, 34: heat insulation case, 40: extraction conductor portion, 41: low temperature-side conductor portion, 41a: low temperature-side seal portion, 42: ordinary temperature-side conductor portion, 42a: ordinary temperature-side seal portion, 43: lead, 44: ground line, 50: end connection box, 51, 52: refrigerant bath, 53: vacuum insulation bath, 53a: extensible portion, 60: bushing, 61: extraction conductor portion, 62: hollow porcelain, 63: epoxy unit, 70: short-circuited portion, 100: superconducting cable for three-phase AC transmission, 101: heat insulation pipe, 101a: external pipe, 101b: internal pipe, 102: cable core, 103: space, 104: corrosion-proof layer, 200: former, 201: superconducting conductor layer, 202: electrical insulation layer, 203: superconducting shield layer, 204: protection layer.

BEST MODES FOR CARRYING OUT THE INVENTION

Embodiments of the present invention will now be described.

EXAMPLE 1

Figure 1:
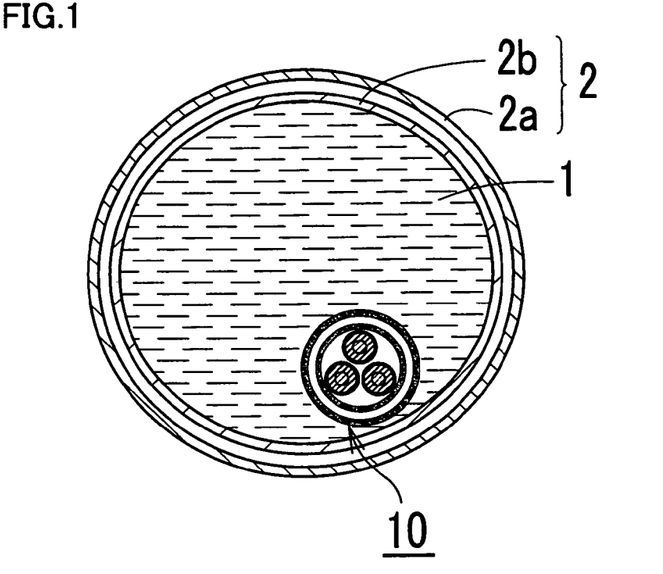
FIG. 1 is a schematic cross-sectional view of a construction of a superconducting cable line of the present invention.
Figure 2:
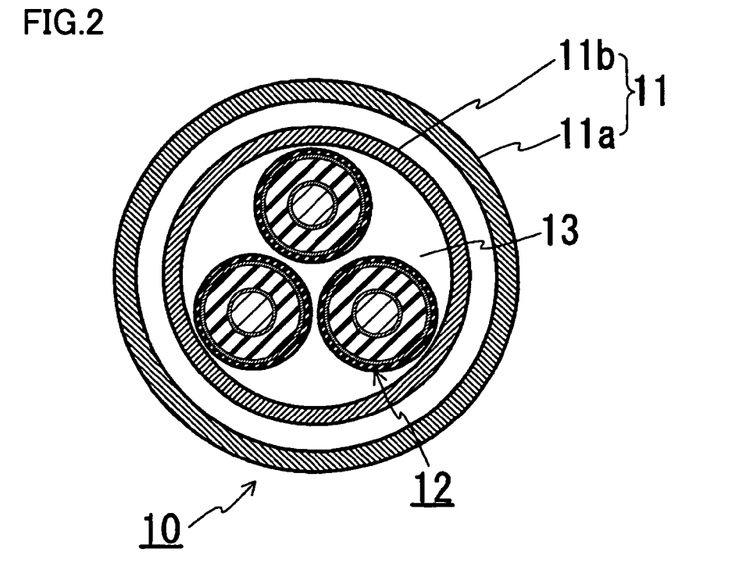
FIG. 2 is a schematic cross-sectional view of a construction of a portion near a superconducting cable in the superconducting cable line of the present invention.
Figure 3:
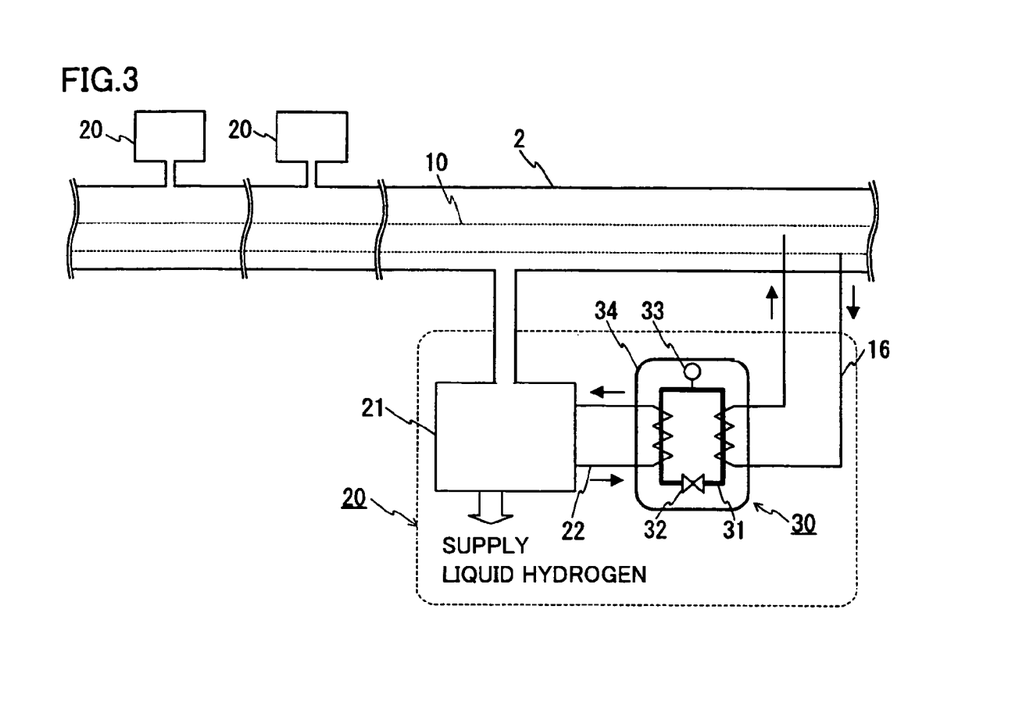
FIG. 3 is a schematic view of a construction in which the superconducting cable line of the present invention is constructed.

FIG. 1 is a schematic cross-sectional view of a construction of a superconducting cable line of the present invention. FIG. 2 is a schematic cross-sectional view of a construction of a portion near a superconducting cable in the superconducting cable line of the present invention. FIG. 3 is a schematic view of a construction in which the superconducting cable line of the present invention is constructed. The same characters in the drawings indicate the same portions. The superconducting cable line of the present invention includes a heat insulation pipe for a fluid 2 transporting liquid hydrogen 1, a superconducting cable 10 housed in heat insulation pipe for a fluid 2, and heat exchange means 30 for adjusting a temperature of liquid hydrogen 1 and a temperature of a refrigerant of the cable.

Superconducting cable 10 utilized in this example has a construction in which three cable cores 12 are stranded and housed in a heat insulation pipe for a cable 11, which construction is basically similar to that of a superconducting cable shown in FIG. 7. Each cable core 12 includes, from a center portion thereof, a former, a superconducting conductor layer, an electrical insulation layer, an external superconducting layer, and a protection layer. Each of the superconducting conductor layer and the external superconducting layer was formed with a Bi2223-based superconducting tape line (an Ag—Mn sheath line). The superconducting conductor layer and the external superconducting layer were formed by spirally winding the superconducting tape line on an outer periphery of the former and on an outer periphery of the electrical insulation layer, respectively. A plurality of stranded copper lines were used as the former. A cushion layer was formed between the former and the superconducting conductor layer with insulating paper. The electrical insulation layer was constructed by winding semisynthetic insulating paper (PPLP: a trademark of Sumitomo Electric Industries, Ltd.) on an outer periphery of the superconducting conductor layer. The protection layer was provided by winding kraft paper on an outer periphery of the external superconducting layer. An internal semi-conducting layer and an external semi-conducting layer may be respectively provided on an inner periphery side and an outer periphery side (below the external superconducting layer) of the electrical insulation layer. Three cable cores 12 as such are prepared, stranded with slack to have an allowance for thermal contraction, and housed in heat insulation pipe for a cable 11. In this example, an SUS corrugated pipe was used to form heat insulation pipe for a cable 11, in which a heat insulating material (not shown) having a multilayer structure was arranged between a double pipe formed with an external pipe 11a and an internal pipe 11b, and air between external pipe 11a and internal pipe 11b was evacuated to attain a prescribed degree of vacuum to form a vacuum multilayer insulation construction. Space 13 enclosed with an inner periphery of internal pipe 11b and outer peripheries of three cable cores 12 becomes a passage of the refrigerant. The refrigerant for cooling the superconducting conductor layer and the external superconducting layer is circulated in this passage using a pump or the like. In this example, liquid nitrogen (about 77 K) was utilized as the refrigerant. A pipeline 16 is connected to heat insulation pipe for a cable 11 of superconducting cable 10 for performing circulation transportation of the refrigerant in which, for example, the refrigerant is ejected from heat insulation pipe 11 to a side of heat exchange means 30 and the refrigerant flows from the side of heat exchange means 30 into heat insulation pipe 11. A pump, which is not shown, is arranged on a portion of pipeline 16 to circulate the refrigerant.

Superconducting cable 10 having a construction as described above is housed in heat insulation pipe for a fluid 2. Heat insulation pipe for a fluid 2 in this example has a construction of a double pipe structure formed with an external pipe 2a and an internal pipe 2b, in which a heat insulating material (not shown) is arranged between pipes 2a, 2b, and air between the pipes is evacuated. Space enclosed with an inner periphery of internal pipe 2b and an outer periphery of superconducting cable 10 becomes a transportation passage for liquid hydrogen 1. Each of pipes 2a, 2b was a welded pipe made of steel, and cable 10 was housed in internal pipe 2b by arranging superconducting cable 10 on a steel plate for forming internal pipe 2b and welding both edges of the steel plate. In this example, superconducting cable 10 is arranged in internal pipe 2b while being immersed in liquid hydrogen. Heat insulation pipe for a fluid 2 in this example was formed to construct a pipeline for transporting liquid hydrogen from a hydrogen plant (not shown) to each hydrogen station 20. Each hydrogen station 20 includes a tank 21 storing liquid hydrogen and heat exchange means 30 for exchanging heat between liquid hydrogen 1 and the refrigerant of superconducting cable 10. Tank 21 is connected to heat insulation pipe for a fluid 2 and stores liquid hydrogen transported through heat insulation pipe for a fluid 2. In addition, a pipeline 22 is connected to tank 21 for performing circulation transportation of liquid hydrogen in which, for example, liquid hydrogen is ejected from tank 21 to a side of heat exchange means 30 and liquid hydrogen flows from the side of heat exchange means 30 into tank 21. A pump, which is not shown, is included in a portion of pipeline 22 to circulate liquid hydrogen.

Heat exchange means 30 in this example includes a passage 31 circulating a heat-exchanging medium such as helium, an expansion valve 32 expanding the heat-exchanging medium, a compressor 33 compressing the expanded heat-exchanging medium, and a heat insulation case 34 housing these elements. Pipeline 22 is arranged such that, a portion of pipeline 22 for circulation transportation of liquid hydrogen contacts a portion of passage 31 which passed through expansion valve 32 so as to cool liquid hydrogen with the expanded heat-exchanging medium. With this construction, liquid hydrogen is cooled near the portion of pipeline 22 contacting the portion of passage 31 which passed through expansion valve 32. Therefore, liquid hydrogen ejected from tank 21 flows through pipeline 22, is cooled with heat exchange means 30, and returns to tank 21. In addition, pipeline 16 is arranged such that, a portion of pipeline 16 for circulation transportation of the refrigerant (liquid nitrogen) of cable 10 contacts a portion of passage 31 which passed through compressor 33 so as to rise a temperature of the refrigerant of cable 10, which was cooled with liquid hydrogen, with the compressed heat-exchanging medium within a temperature range capable of maintaining the superconducting state. With this construction, the temperature of the refrigerant is risen near the portion of pipeline 16 contacting the portion of passage 31 which passed through compressor 33. Therefore, the refrigerant ejected from heat insulation pipe for a cable 11 flows through pipeline 16, has the temperature risen with heat exchange means 30, and returns to heat insulation pipe 11.

The superconducting cable housed in the heat insulation pipe for a fluid has an outer periphery covered with cryogenic liquid hydrogen, and has a double heat insulation structure formed with the heat insulation pipe of the cable itself and the heat insulation pipe for liquid hydrogen. With this construction, the line of the present invention can substantially reduce heat intrusion from the outside into the superconducting cable. In addition, since the outer periphery of the superconducting cable is covered with cryogenic liquid hydrogen, heat from liquid hydrogen is conducted to the cable and the refrigerant of the cable is cooled. Therefore, a cooling system for cooling the refrigerant of the superconducting cable may not be necessary. As a result, energy for cooling the refrigerant of the superconducting cable can be reduced and a coefficient of performance can be increased by constructing the superconducting cable line of the present invention.

Furthermore, since the line of the present invention includes the heat exchange means for exchanging heat between the refrigerant of the superconducting cable and liquid hydrogen to concurrently perform heating of the refrigerant and cooling of liquid hydrogen, a temperature difference between objects of a heat exchange can be decreased and energy for cooling liquid hydrogen can be reduced with the heat exchange means. In addition, with the heat exchange means included in the line of the present invention, heat associated with cooling of liquid hydrogen can be utilized to rise the temperature of the refrigerant of the superconducting cable which was excessively cooled because of being housed in the heat insulation pipe for a fluid. Therefore, utilizing the heat exchange means constructed to exchange heat between liquid hydrogen and the refrigerant of the superconducting cable, the line of the present invention can adjust a temperature of liquid hydrogen to an appropriate temperature and can also adjust a temperature of the refrigerant of the cable to an appropriate temperature. As a result, energy for cooling the refrigerant of the superconducting cable and energy for cooling liquid hydrogen can both be reduced by constructing the superconducting cable line of the present invention.

It is to be noted that, though a construction shown in this example has a whole length in a longitudinal direction of the superconducting cable housed in the heat insulation pipe for a fluid, only a portion of the cable may be housed in the heat insulation pipe for a fluid. In the line of the present invention, an effect of reduction of heat intrusion may be decreased and adjustment of the temperature of the refrigerant of the superconducting cable with the heat exchange means may become difficult when only a small portion of the superconducting cable is housed in the heat insulation pipe for a fluid. Therefore, in the line of the present invention, a sufficient portion of the superconducting cable is housed in the heat insulation pipe for a fluid to allow adjustment of the temperature of the refrigerant of the superconducting cable with the heat exchange means.

EXAMPLE 2

Figure 4:
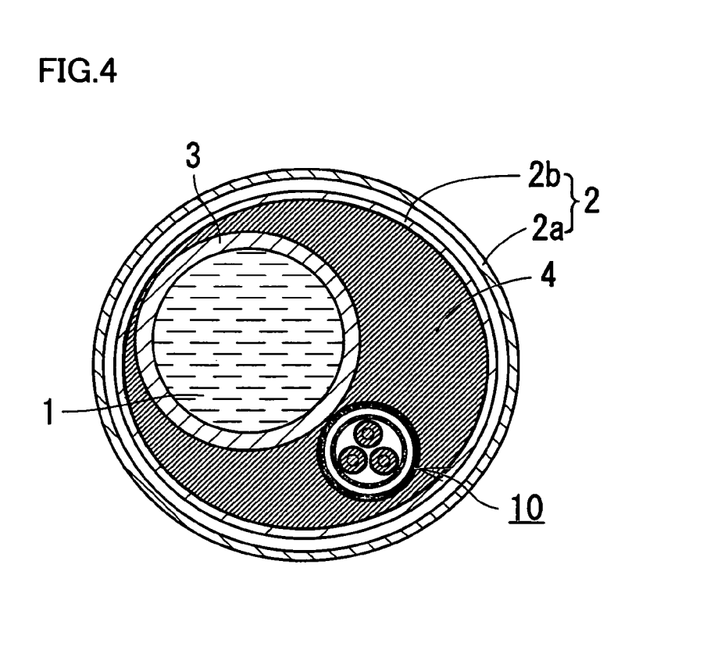
FIG. 4 is a schematic view of a construction of the superconducting cable line of the present invention including a transportation pipe for liquid hydrogen, the superconducting cable and a heat exchanger spacer inside a heat insulation pipe for a fluid, which is a schematic cross-sectional view of a construction of a portion near the cable.

Though the superconducting cable was immersed in liquid hydrogen in example 1 described above, the superconducting cable may be housed in the heat insulation pipe for a fluid without being immersed in liquid hydrogen. As an example, a transportation passage for liquid hydrogen may be separately provided in the heat insulation pipe for a fluid. FIG. 4 is a schematic view of a construction of the superconducting cable line of the present invention including a transportation pipe for liquid hydrogen and a heat exchanger spacer inside the heat insulation pipe for a fluid, which is a schematic cross-sectional view of a construction of a portion near the cable. This superconducting cable line has a construction including a separate transportation pipe 3 for liquid hydrogen in internal pipe 2b of heat insulation pipe for a fluid 2. A heat exchanger spacer 4 having high heat conductivity is arranged in space enclosed with an inner periphery of internal pipe 2b, an outer periphery of transportation pipe 3 and an outer periphery of superconducting cable 10. With this construction, superconducting cable 10 has a double heat insulation structure formed with heat insulation pipe for a fluid 2 and heat insulation pipe 11 of cable 10 itself (see FIGS. 1, 2) as in example 1, and therefore heat intrusion from the outside into the cable can be reduced. In addition, since heat from liquid hydrogen is conducted to superconducting cable 10 via heat exchanger spacer 4, cable 10 can also be cooled with liquid hydrogen 1. Furthermore, since transportation pipe 3 is included to physically separate superconducting cable 10 from liquid hydrogen 1, a problem such as firing of liquid hydrogen 1 can be prevented when an accident such as a short circuit of cable 10 occurs and a spark is generated. In this example, the heat exchanger spacer was formed by winding aluminum.

The superconducting cable line of the present invention shown in each of examples 1 and 2 described above can be utilized for either of DC transmission and AC transmission. In a situation of the DC transmission, when the superconducting cable including the cable core having the electrical insulation layer subjected to $\rho$ grading to have a low resistivity on an inner periphery side and a high resistivity on an outer periphery side is utilized, a DC electric field distribution in a thickness direction of the electrical insulation layer can be smoothed and a DC withstand voltage property can be increased. The resistivity can be varied using PPLP (trademark) having various ratios k. The resistivity tends to increase as ratio k increases. In addition, when a high $\epsilon$ layer is provided in the electrical insulation layer near the superconducting conductor layer, an Imp. withstand voltage property can be increased in addition to an increase in the DC withstand voltage property. The high $\epsilon$ layer may be formed using, for example, PPLP (trademark) having a low ratio k. In this situation, the high $\epsilon$ layer also becomes a low $\rho$ layer. Furthermore, the superconducting cable including the cable core having the electrical insulation layer subjected to the $\rho$ grading and also formed to have permittivity $\epsilon$ increased toward the inner periphery side and decreased toward the outer periphery side also has good AC characteristics. Therefore, the line of the present invention utilizing the cable as such can also be suitably utilized for the AC transmission. As an example, the electrical insulation layer may be provided using PPLP (trademark) having various ratios k as indicated below to have three different resistivities and permittivities. The following three layers may be successively provided from the inner periphery side (X and Y are constants).

Low $\rho$ layer: ratio k=60%, resistivity $\rho$ (20° C.)=X [$\Omega \cdot$m], permittivity $\epsilon$=Y Intermediate $\rho$ layer: ratio k=70%, resistivity $\rho$ (20° C.)=about 1.2X [$\Omega \cdot$cm], permittivity $\epsilon$=about 0.95Y High $\rho$ layer: ratio k=80%, resistivity $\rho$ (20° C.)=about 1.4X [$\Omega \cdot$cm], permittivity $\epsilon$=about 0.9Y When monopolar transmission is performed with the line of the present invention using the superconducting cable subjected to the $\rho$ grading and the $\epsilon$ grading, two cores out of three cable cores 12 (see FIG. 2) may be used as auxiliary cores, the superconducting conductor layer of one core may be used as a go conductor and the external superconducting layer of the core may be used as a return conductor. Alternatively, the superconducting conductor layer of each core may be used as the go conductor and the external superconducting layer of each core may be used as the return conductor to construct a three-line monopolar transmission line. On the other hand, when bipolar transmission is performed, one core out of three cores may be used as an auxiliary core, the superconducting conductor layer of one core may be used as a positive electrode line, the superconducting conductor layer of another core may be used as a negative electrode line, and the external superconducting layers of both cores may be used as neutral conductor layers.

Figure 5:
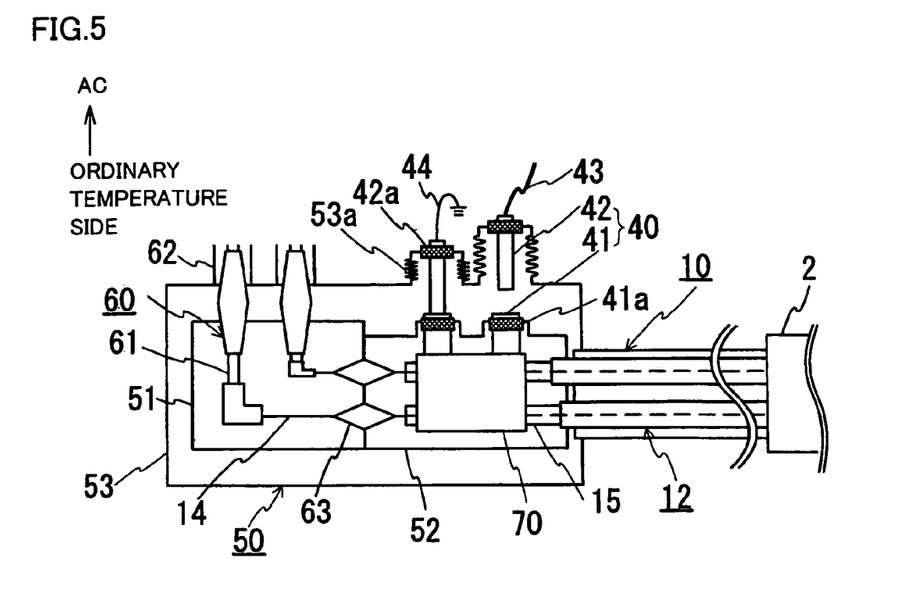
FIG. 5 is a schematic view of a construction of a terminal structure formed in an end portion of the superconducting cable line of the present invention using a three-core type superconducting cable in a situation of an AC transmission line.
Figure 6:
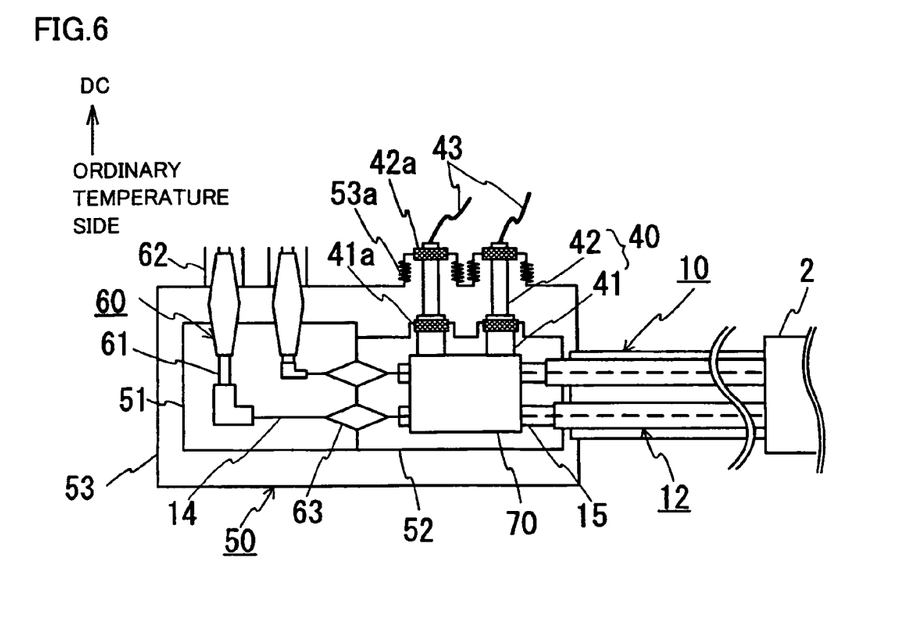
FIG. 6 is a schematic view of a construction of a terminal structure formed in an end portion of the superconducting cable line of the present invention using a three-core type superconducting cable in a situation of a DC transmission line.

The line of the present invention using the superconducting cable subjected to the $\rho$ grading and the $\epsilon$ grading and including a terminal structure as described below can readily perform the DC transmission such as monopolar transmission or bipolar transmission after the AC transmission, or the AC transmission after the DC transmission. Each of FIGS. 5 and 6 is a schematic view of a construction of a terminal structure having a removable extraction conductor portion, which is formed in an end portion of the superconducting cable line of the present invention using a three-core type superconducting cable. FIG. 5 indicates a situation of an AC transmission line, and FIG. 6 indicates a situation of a DC transmission line. Though two cable cores 12 are only shown in each of FIGS. 5 and 6, there actually are three cores.

The terminal structure includes an end portion of cable core 12 extending from an end portion of superconducting cable 10, extraction conductor portions 40, 61 connected to a conductive portion (not shown) on an ordinary temperature side, a connection portion electrically connecting the end portion of core 12 with extraction conductor portion 40 and the end portion of core 12 with extraction conductor portion 61, and an end connection box 50 housing the end portion of core 12, end portions of extraction conductor portions 40, 61 on a side connected to the core, and the connection portion. End connection box 50 includes a refrigerant bath 51 filled with a refrigerant for cooling superconducting conductor layer 14, into which superconducting conductor layer 14 exposed by step stripping of the end portion of core 12 is introduced, a refrigerant bath 52 filled with a refrigerant for cooling an external superconducting layer 15, into which external superconducting layer 15 also exposed by step stripping is introduced, and a vacuum insulation bath 53 arranged on outer peripheries of refrigerant baths 51, 52. Extraction conductor portion 61, which is embedded in bushing 60 arranged between the conductive portion on the ordinary temperature side and superconducting conductor layer 14, is connected to superconducting conductor layer 14 via a joint (a connection portion) to allow transmission and reception of power between superconducting cable 10 and the conductive portion on the ordinary temperature side. A side (an ordinary temperature side) of bushing 60 connected to the conductive portion on the ordinary temperature side projects from vacuum insulation bath 53 and is housed in hollow porcelain 62 provided to project from vacuum insulation bath 53.

On the other hand, external superconducting layer 15 is connected via a short-circuited portion 70 (a connection portion) described below to extraction conductor portion 40 arranged between the conductive portion on the ordinary temperature side and external superconducting layer 15 to allow transmission and reception of power between superconducting cable 10 and the conductive portion on the ordinary temperature side. Extraction conductor portion 40 is formed with a low temperature-side conductor portion 41 connected to short-circuited portion 70 and an ordinary temperature-side conductor portion 42 arranged on the ordinary temperature side which is removable from low temperature-side conductor portion 41. In this example, ordinary temperature-side conductor portion 42 is formed in a rod-like shape having a prescribed cross-sectional area, and low temperature-side conductor portion 41 is formed in a cylindrical shape into which the rod-like ordinary temperature-side conductor portion 42 can be fitted. When ordinary temperature-side conductor portion 42 is inserted into low temperature-side conductor portion 41, the portions 41 and 42 are electrically connected to each other to allow transmission and reception of power between the low temperature side and the ordinary temperature-side, and the portions 41 and 42 are brought out of conduction when ordinary temperature-side conductor portion 42 is removed from low temperature-side conductor portion 41. A plurality of extraction conductor portions 40 as such are included in the terminal structure. Low temperature-side conductor portion 41 is fixed on refrigerant bath 52 and has one end electrically connected to short-circuited portion 70 and the other end arranged to enter vacuum insulation bath 53. A low temperature-side seal portion 41a made of FRP is provided on an outer periphery of a fixing portion of low temperature-side conductor portion 41 to avoid leaking of the refrigerant, short-circuiting of refrigerant bath 52 and conductor portion 41, and the like. Ordinary temperature-side conductor portion 42 is fixed on vacuum insulation bath 53 and has one end arranged in vacuum insulation bath 53 and the other end arranged to be exposed to the outside of an ordinary temperature. An ordinary temperature-side seal portion 42a made of FRP is provided on an outer periphery of a fixing portion of ordinary temperature-side conductor portion 42 to allow reduction of heat intrusion and to avoid short-circuiting of vacuum insulation bath 53 and conductor portion 42 and the like. In addition, an extensible portion 53a formed with a corrugated pipe is provided on vacuum insulation bath 53 near the fixing portion of ordinary temperature-side conductor portion 42 to maintain a vacuum state of vacuum insulation bath 53 during attachment and removal of extraction conductor portion 40. It is to be noted that, external superconducting layer 15 of each of three cores 12 is short-circuited in short-circuited portion 70. In addition, a lead 43 connected to an external apparatus or the like, or a ground line 44 is attached to an end portion on the ordinary temperature side of ordinary temperature-side conductor portion 42. An epoxy unit 63 is arranged on an outer periphery of a portion of superconducting conductor layer 14 which is arranged near a portion between refrigerant baths 51, 52.

When the superconducting cable line of the present invention including the terminal structure having a construction as described above is utilized as, for example, a three-phase AC line, extraction conductor portion 40 connected to external superconducting layer 15 should have a cross-sectional area of the conductor required to obtain a voltage to ground. Therefore, as shown in FIG. 5, while low temperature-side conductor portion 41 and ordinary temperature-side conductor portion 42 of extraction conductor portion 40 needed are connected to each other, low temperature-side conductor portion 41 and ordinary temperature-side conductor portion 42 of extraction conductor portion 40 not needed are separated from each other to obtain a required cross-sectional area of the conductor. In this example, ground line 44 for grounding is connected to the end portion on the ordinary temperature side of ordinary temperature-side conductor portion 42 of extraction conductor portion 40 which is connected.

On the other hand, when a change from the three-phase AC transmission as shown in FIG. 5 to the DC transmission is requested, a current equivalent to that for superconducting conductor layer 14 flows through external superconducting layer 15. That is, the current flowing through external superconducting layer 15 is increased and a current flowing through extraction conductor portion 40 is also increased as compared to those in the situation of the AC transmission shown in FIG. 5. Therefore, as shown in FIG. 6, low temperature-side conductor portion 41 and ordinary temperature-side conductor portion 42 of extraction conductor portion 40 which were separated during the AC transmission are connected to each other to ensure a sufficient cross-sectional area of the conductor for passing a required amount of current. In this example, lead 43 for grounding is connected to the end portion on the ordinary temperature side of ordinary temperature-side conductor portion 42 of extraction conductor portion 40 which is connected. Reversely, when a change from the DC transmission as shown in FIG. 6 to the AC transmission is requested, one of extraction conductor portions 40 which was brought into conduction during the DC transmission is separated to bring out of conduction.

INDUSTRIAL APPLICABILITY

A superconducting cable line of the present invention is suitably utilized as a line for performing power transmission to various power apparatuses. The superconducting cable line of the present invention may be constructed by, for example, housing a superconducting cable in a pipeline transporting liquid hydrogen and arranging heat exchange means in a hydrogen station connected to the pipeline. In this situation, the line of the present invention may be utilized as a power supply line for a power apparatus inside the hydrogen station or as a power supply line for an arbitrary power apparatus, which draws power as required from a heat insulation pipe for a fluid. In addition, since the cable line of the present invention can be constructed during construction of a transportation passage for liquid hydrogen or the hydrogen station, workability for laying is increased.

The invention claimed is:
1. A superconducting cable line, comprising:
a heat insulation pipe;
liquid hydrogen in said heat insulation pipe;
a superconducting cable housed in said heat insulation pipe;

a refrigerant in said superconducting cable, the refrigerant having a temperature higher than that of said liquid hydrogen and cooling a superconducting portion of said superconducting cable; and a heat exchange means for cooling said liquid hydrogen and raising a temperature of said refrigerant in said cable cooled with said liquid hydrogen; and said heat insulation pipe and said superconducting cable being configured such that said liquid hydrogen flows outside said superconducting cable and said refrigerant flows inside of said superconducting cable.

2. The superconducting cable line according to claim 1, wherein said superconducting cable is immersed in said liquid hydrogen.

3. The superconducting cable line according to claim 1, wherein
a region inside said heat insulation pipe is divided into a transportation region for transporting said liquid hydrogen and a second region for arranging said superconducting cable therein.

4. The superconducting cable line according to claim 1, wherein
the refrigerant of said superconducting cable is liquid nitrogen.

5. The superconducting cable line according to claim 1, wherein
said superconducting cable includes a superconducting conductor layer and an electrical insulation layer provided on an outer periphery of said superconducting conductor layer, and
said electrical insulation layer is subjected to $\rho$ grading for attaining a low resistivity on an inner periphery side of said electrical insulation layer and a high resistivity on an outer periphery side to smooth a DC electric field distribution in a diameter direction thereof.

6. The superconducting cable line according to claim 5, wherein
said electrical insulation layer has a high $\epsilon$ layer provided near said superconducting conductor layer and having a permittivity higher than that in another portion.

7. The superconducting cable line according to claim 5, wherein
said electrical insulation layer is constructed to have a permittivity $\epsilon$ increased toward the inner periphery side and decreased toward the outer periphery side.

8. The superconducting cable line according to claim 1, further comprising the refrigerant flowing inside said superconducting cable having a boiling point that is higher than a boiling point of the liquid hydrogen flowing outside said superconducting cable.

9. The superconducting cable line according to claim 1, wherein the heat exchanger means is configured to lower the temperature of the liquid hydrogen while increasing the temperature of the refrigerant.

10. The superconducting cable line according to claim 1, further comprising said liquid hydrogen flowing through the outside of said superconducting cable and said refrigerant flowing through the inside of said superconducting cable.

11. The superconducting cable line according to claim 1, wherein the heat exchange means is configured to transport heat from liquid hydrogen to the refrigerant.

12. The superconducting cable line according to claim 1, wherein the heat exchange means comprises:
a passage circulating a heat-exchanging medium;
an expansion valve expanding the heat-exchanging medium to form an expanded heat-exchange medium;
a compressor compressing the expanded heat-exchanging medium to form a compressed heat exchange medium;
a transportation pipeline containing liquid hydrogen, for conveying liquid hydrogen through the expansion valve to cool the liquid hydrogen with the expanded heat-exchanging medium; and
a transportation pipeline for the refrigerant, for conveying refrigerant through the compressor to increase a temperature of the refrigerant of the superconducting cable with the compressed heat-exchanging medium.

* * * * *